United States Patent
Suryanarayana et al.

(10) Patent No.: US 12,463,818 B2
(45) Date of Patent: Nov. 4, 2025

(54) TRUSTED MMIO ACCESS IN MULTITENANT VIRTUALIZED ARCHITECTURE

(71) Applicant: Dell Products L.P., Round Rock, TX (US)

(72) Inventors: Shekar Babu Suryanarayana, Bangalore (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 18/311,163

(22) Filed: May 2, 2023

(65) Prior Publication Data
US 2024/0372730 A1    Nov. 7, 2024

(51) Int. Cl.
*H04L 9/32* (2006.01)
(52) U.S. Cl.
CPC ...... *H04L 9/3234* (2013.01); *H04L 2209/127* (2013.01)

(58) Field of Classification Search
CPC ............. H04L 9/3234; H04L 2209/127; H04L 9/3265; H04L 9/3278; H04L 2209/16; H04L 2209/608; H04L 2209/64; H04L 9/32
See application file for complete search history.

(56) References Cited

U.S. PATENT DOCUMENTS

| | | | |
|---|---|---|---|
| 2019/0052456 A1* | 2/2019 | Bygrave | G06F 21/6209 |
| 2021/0117246 A1* | 4/2021 | Lal | G06F 9/3814 |
| 2022/0103536 A1* | 3/2022 | Kida | G06F 9/5044 |
| 2023/0188366 A1* | 6/2023 | Steinmetz | H04L 9/3247 |
| | | | 713/176 |

* cited by examiner

*Primary Examiner* — Quazi Farooqui
(74) *Attorney, Agent, or Firm* — Jackson Walker L.L.P.

(57) ABSTRACT

An information handling system may include at least one processor and an information handling resource. The information handling system may be configured to enable memory-mapped input/output (MMIO) communication between a program executing on the at least one processor and the information handling resource via a sealed memory region based on a cryptographic trust relationship existing between the program and the information handling resource.

12 Claims, 3 Drawing Sheets

TRUSTED MMIO ACCESS IN MULTITENANT VIRTUALIZED ARCHITECTURE

TECHNICAL FIELD

The present disclosure relates in general to information handling systems, and more particularly to performing memory-mapped input/output (MMIO) in information handling systems using a multitenant virtualized architecture.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

MMIO is a method of performing I/O between the central processing unit (CPU) of an information handling system and peripheral devices. Memory-mapped I/O typically uses the same address space to address both main memory and I/O devices. The memory and registers of the I/O devices are mapped to (associated with) address values.

Virtualization is a process that allows for more efficient utilization of physical computer hardware and is the foundation of cloud computing. Some of the key properties of virtualization are partitioning, isolation, encapsulation, and hardware independency. Device isolation may be accomplished in some embodiments by MMIO address space mapping machines. For purposes of this disclosure, to virtual virtualization may refer to the use of virtual machines (VMs) as well as containers.

Use of MMIO in the virtualization context can give rise to certain issues, however. For example, processor MMIO stale data vulnerabilities are a class of MMIO vulnerabilities that can expose data. When a processor core reads or writes data using MMIO, the transaction is normally done with un-cacheable or write-combining memory types and is routed through off-core circuitry referred to as the "uncore" or the "system agent," which is shared by multiple physical processor cores and provides several common services. Malicious actors may use uncore buffers and mapped registers to leak information from different hardware threads within the same physical core or across cores. In general, any VM mapped MMIO address space may be subject to this vulnerability.

Processor MMIO stale data vulnerabilities may propagate stale data into core fill buffers, where the data may subsequently be inferred by a transient execution attack. These vulnerabilities involve operations that result in stale data being directly read into an architectural, software-visible state or sampled from a buffer or register. In some attack scenarios, stale data may already reside in a micro-architectural buffer. In other attack scenarios, malicious actors or buggy code may propagate data from microarchitecture locations such as fill buffers. Hypervisor and OS mapped I/O ports may become vulnerable for transient execution due to isolation map created at the OS or hypervisor to the VMs.

Integrated devices like graphics controllers and embedded controllers (ECs) may also be impacted by these MMIO vulnerabilities, which can freeze the platform, requiring the system to be power cycled. MMIO stale data vulnerabilities may be combined with data propagators to potentially enable malicious actors to read stale data.

Embodiments of this disclosure may provide improvements with regard to these and other issues.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with performing MMIO in a multitenant virtualized architecture may be reduced or eliminated.

In accordance with embodiments of the present disclosure, an information handling system may include at least one processor and an information handling resource. The information handling system may be configured to enable memory-mapped input/output (MMIO) communication between a program executing on the at least one processor and the information handling resource via a sealed memory region based on a cryptographic trust relationship existing between the program and the information handling resource.

In accordance with these and other embodiments of the present disclosure, a method may include an information handling system executing a program on at least one host processor thereof; and the information handling system enabling memory-mapped input/output (MMIO) communication between a program executing on the at least one processor and an information handling resource via a sealed memory region based on a cryptographic trust relationship existing between the program and the information handling resource.

In accordance with these and other embodiments of the present disclosure, an article of manufacture may include a non-transitory, computer-readable medium having computer-executable code thereon that is executable by an information handling system for: executing a program on at least one host processor thereof; and enabling memory-mapped input/output (MMIO) communication between a program executing on the at least one processor and an information handling resource via a sealed memory region based on a cryptographic trust relationship existing between the program and the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
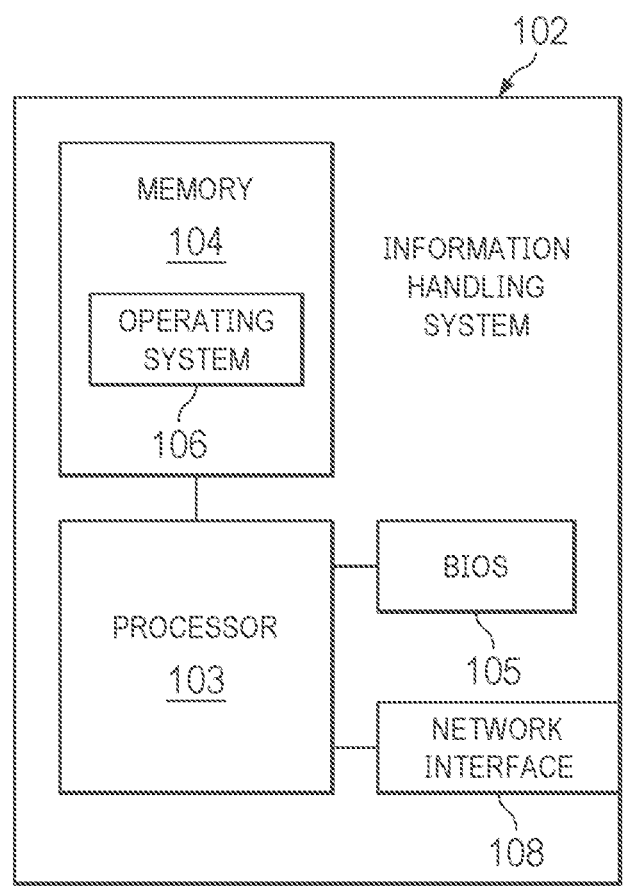
FIG. 1 illustrates a block diagram of an example information handling system, in accordance with embodiments of the present disclosure.
Figure 2:
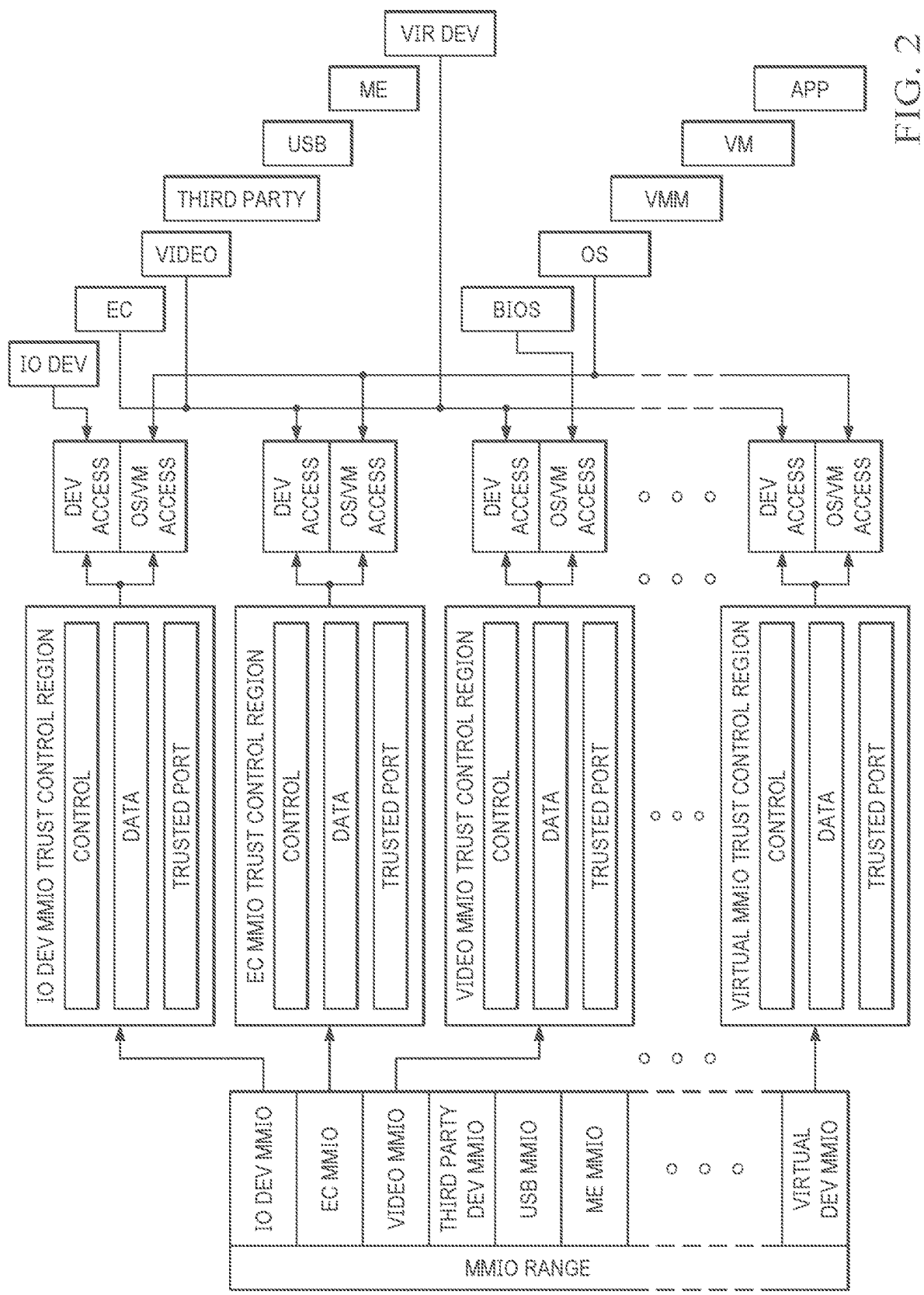
FIG. 2 illustrates an example architecture in which access to various MMIO trust control regions is securely managed, in accordance with embodiments of the present disclosure.
Figure 3:
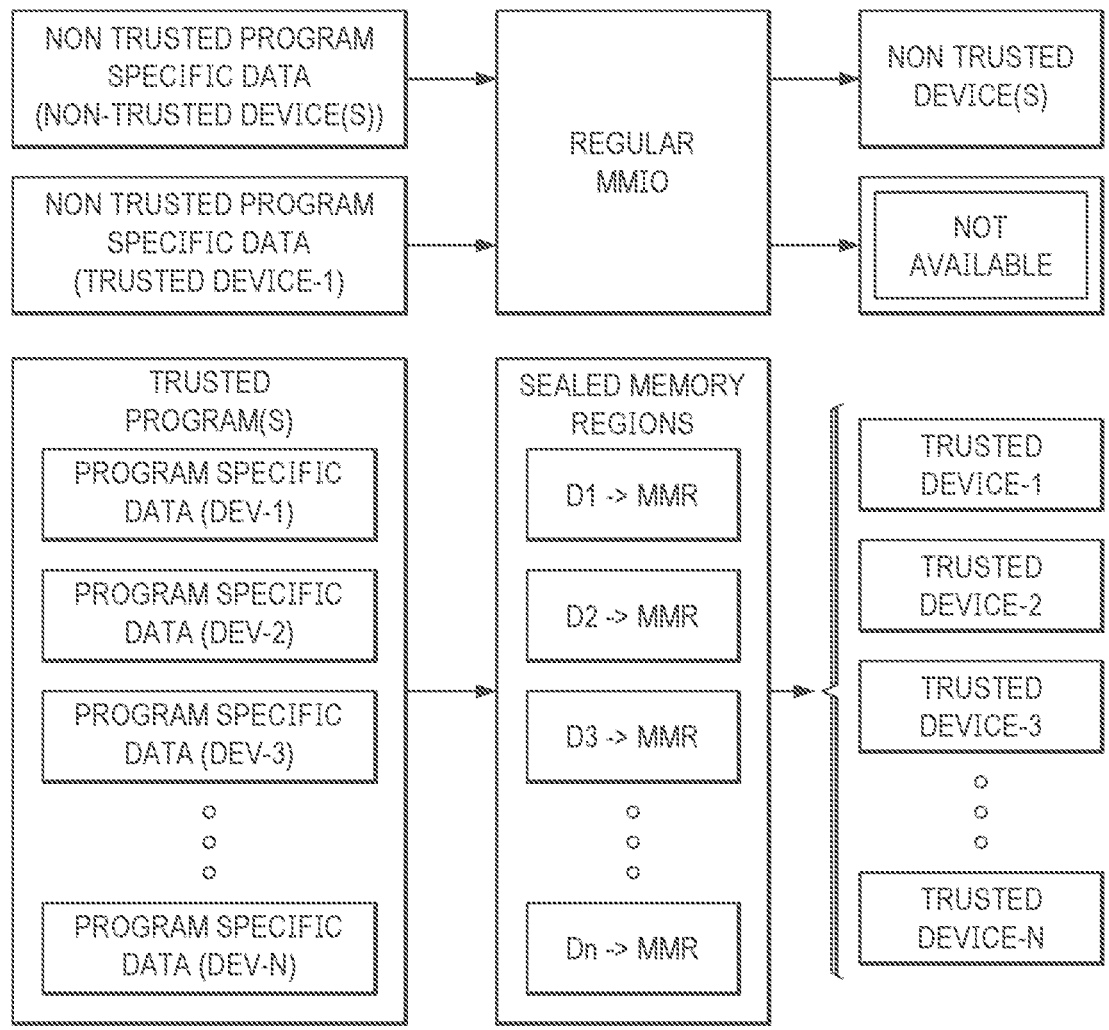
FIG. 3 illustrates device context specific MMIO memory regions, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), a remote access controller (e.g., a Dell Remote Access Controller (DRAC) or Integrated Dell Remote Access Controller (iDRAC)), or an embedded controller (EC).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In some embodiments, processor 103 may comprise a system-on-a-chip (SoC). As discussed above, MMIO may be used to allow communication between processor 103 and various other devices (e.g., information handling resources). Embodiments of this disclosure may provide a trusted MMIO zone usable in a multitenant virtualized architectures to provide secure MMIO access for integrated devices by trusted VMs. This may also be implemented in an SoC-agnostic fashion, such that the same solution is usable with different types and architectures of SoC.

Embodiments may also provide a block MMIO propagation (BMP) method for blocking secret data from being placed into open buffers, from which it can be extracted. Instead, secret intermediate data may be stored in trust-sealed memory regions.

Embodiments may also provide a block MMIO vulnerabilities (BMV) method to block untrusted software from extracting data from or inserting data into vulnerable buffers. Instead, only trusted software can perform data push/pull with respect to the MMIO buffers.

These features may be implemented without compromising performance with the use of a special register protected direct buffer (SRPDB) allowing fast and safe MMIO operations.

According to one embodiment, sealed memory regions may be implemented to allocate MMIO memory regions for a specific device and a trusted program by exchanging a pre-defined signed hash (referred to as a blob). A mapping is enumerated to the OS runtime to expose the sealed map only to the registered device and trusted programs. Non-trusted programs may fail to perform a load map of MMIO regions, as the sealed MMIO region enumeration may be unavailable to non-trusted programs at runtime.

FIG. 2 shows an SoC-agnostic trusted MMIO zone (TMZ) implemented across multitenant virtualized architectures, providing secure MMIO access for integrated devices to trusted VMs. A firmware mapped TMZ may be created during the early PEI phase of boot (e.g., during memory reference code (MRC) execution), and the corresponding trust control regions (TCRs) are allocated and mapped as depicted in FIG. 2. For every TCR device and OS/VM/BIOS access, trust ports are created which can be dynamically relocated into OS runtime memory in the trusted memory map created by pre-boot memory drivers.

These trust ports can be mapped safely with controlled data access once a trust port is opened. These trusted ports are the firmware remapped memory offsets which are enumerated and unexposed to any OS/VM/applications, accessible only by BIOS runtime drivers. The enumerated ports can be mapped to trusted devices/programs at OS runtime on a session basis with signed blobs.

To enable uncompromised performance, the trusted ports are mapped with SRPDB as shown in FIG. 2. The control and data read/write operations may be implemented in a performant and safe manner, as the enumeration and mapping is done based on cryptographically signed blob methods.

FIG. 3 shows an example of device context specific MMIO memory regions (MMRs). Embodiments may implement a BMP method as mentioned above for preventing secret data from getting into open buffers, from which it can be extracted. Instead, secret intermediate data may be stored in trust sealed memory regions.

Devices can register during boot time with trusted certificates/signatures to get their MMIO memory region (MMR) within a sealed memory region for enabling device-specific MMIO transactions at OS runtime. Similarly, the programs can execute their supported methods with trusted signatures to get the dynamic memory maps through sealed memory regions to perform device-specific transactions. In this way, all secret data which a program attempts to put into open buffers can go through sealed memory regions to ensure high security in MMIO transactions to devices. The same applies for VM/OS applications performing such transactions.

A BMV method as mentioned above may prevent untrusted software from extracting data from or inserting data into vulnerable buffers. Instead, only trusted software can perform data push/pull with respect to MMIO buffers.

Accordingly, with the emphasis on high security, embodiments of this disclosure provide SoC-agnostic safe and trusted MMIO transaction at runtime, preventing vulnerable MMIO access across multitenant virtualized architectures. With sealed memory regions, all trusted devices can use their own private device-specific data transaction zone for program to device MMIO transactions.

Thus embodiments may avoid processor MMIO stale data vulnerabilities that would propagate stale data into core buffers, where the data may subsequently be inferred by an unmitigated transient execution attack. Every device may get its own private sealed memory regions for MMIO transactions, which may be completely hidden and not enumerated to non-trusted programs/devices.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    at least one processor; and
    an information handling resource;
    wherein the information handling system is configured to:
        enable memory-mapped input/output (MMIO) communication between a program executing on the at least one processor and the information handling resource via a sealed memory region based on a cryptographic trust relationship existing between the program and the information handling resource, wherein the cryptographic trust relationship is based on a cryptographically signed data blob; and
        prevent MMIO communication between a second program executing on the at least one processor and the information handling resource, in response to the second program being associated with a different cryptographically signed blob.

2. The information handling system of claim 1, wherein the program executing on the at least one processor comprises an application executing within a virtual machine or a container.

3. The information handling system of claim 1, wherein the information handling system is configured to execute a plurality of programs on the at least one processor in a multitenant architecture.

4. The information handling system of claim 1, wherein the information handling system is further configured to prevent MMIO communication between a third program executing on the at least one processor and the information handling resource, in response to the third program being unsigned.

5. A method comprising:
    an information handling system executing a program on at least one host processor thereof;
    the information handling system enabling memory-mapped input/output (MMIO) communication between a program executing on the at least one processor and an information handling resource via a sealed memory region based on a cryptographic trust relationship existing between the program and the information handling resource, wherein the cryptographic trust relationship is based on a cryptographically signed data blob; and
    the information handling system preventing MMIO communication between a second program executing on the at least one processor and the information handling resource, in response to the second program being associated with a different cryptographically signed blob.

6. The method of claim 5, wherein the program executing on the at least one processor comprises an application executing within a virtual machine or a container.

7. The method of claim 5, wherein the information handling system is configured to execute a plurality of programs on the at least one processor in a multitenant architecture.

8. The method of claim 5, wherein the information handling system is further configured to prevent MMIO communication between a third program executing on the at least one processor and the information handling resource, in response to the third program being unsigned.

9. An article of manufacture comprising a non-transitory, computer-readable medium having computer-executable code thereon that is executable by an information handling system for:
    executing a program on at least one host processor thereof;
    enabling memory-mapped input/output (MMIO) communication between a program executing on the at least one host processor and an information handling resource via a sealed memory region based on a cryptographic trust relationship existing between the program and the information handling resource, wherein the cryptographic trust relationship is based on a cryptographically signed data blob; and
    preventing MMIO communication between a second program executing on the at least one host processor and the information handling resource, in response to the second program being associated with a different cryptographically signed blob.

10. The article of claim 9, wherein the program executing on the at least one processor comprises an application executing within a virtual machine or a container.

11. The article of claim 9, wherein the information handling system is configured to execute a plurality of programs on the at least one processor in a multitenant architecture.

12. The article of claim 9, wherein the information handling system is further configured to prevent MMIO communication between a third program executing on the at least one processor and the information handling resource, in response to the third program being unsigned.

* * * * *